(12) United States Patent
Alfermann

(10) Patent No.: US 9,979,196 B2
(45) Date of Patent: May 22, 2018

(54) SYSTEM OF PARALLEL-CONNECTED GENERATORS AND METHOD FOR LOAD SHARE BALANCING THEREIN USING A SERIAL COMMUNICATION NETWORK

(71) Applicant: REMY TECHNOLOGIES, LLC, Pendleton, IN (US)

(72) Inventor: Timothy J. Alfermann, Carmel, IN (US)

(73) Assignee: BORGWARNER INC., Auburn Hills, MI (US)

( * ) Notice: Subject to any disclaimer, the term of this patent is extended or adjusted under 35 U.S.C. 154(b) by 283 days.

(21) Appl. No.: 14/864,807

(22) Filed: Sep. 24, 2015

(65) Prior Publication Data

US 2016/0094036 A1  Mar. 31, 2016

Related U.S. Application Data

(60) Provisional application No. 62/055,557, filed on Sep. 25, 2014.

(51) Int. Cl.
*H02J 1/10* (2006.01)
*H02J 3/38* (2006.01)
(Continued)

(52) U.S. Cl.
CPC .................. *H02J 3/38* (2013.01); *H02J 1/10* (2013.01); *H02J 3/46* (2013.01); *H02J 7/1423* (2013.01);
(Continued)

(58) Field of Classification Search
CPC ..... H02J 13/00; H02J 1/10; H02J 1/02; H03L 5/02; G05B 15/02; B60L 1/00
(Continued)

(56) References Cited

U.S. PATENT DOCUMENTS 6,476,521 B1 * 11/2002 Lof ............................ H02J 3/24
307/102
6,522,030 B1 * 2/2003 Wall ........................... H02J 3/46
307/43
(Continued)

FOREIGN PATENT DOCUMENTS

EP         2672602 A1    12/2013
JP      2007060863 A     3/2007
WO    WO 2011/059753 A2  5/2011

OTHER PUBLICATIONS

International Search Report and Written Opinion; PCT/US2015/052072; dated Jan. 22, 2016; 11 pages.

*Primary Examiner* — Rexford Barnie
*Assistant Examiner* — Jagdeep Dhillon
(74) *Attorney, Agent, or Firm* — Bose McKinney & Evans LLP

(57) ABSTRACT

A parallel generator system wherein a portion of the electrical load of at least one generator unit is incrementally transferred to at least one other generator unit by the controller on the basis of an indication that the operating stresses of the generator units are disallowably unbalanced, whereby load share balancing tending towards equalization of operating stresses amongst the plurality of generator units occurs over the system service life. Also, a method for load share balancing in a parallel generator system which determines whether the operating stress levels of at least two generator units are disallowably unbalanced by comparing operating stress indicators of the generator units with that of a master generator unit, and incrementally transferring portions the electrical load between at least two generator units on the basis of the comparative evaluation, whereby load share balancing occurs tending to equalize the generator unit operating stress levels.

14 Claims, 2 Drawing Sheets

(51) Int. Cl.
*H02J 7/34* (2006.01)
*H02J 13/00* (2006.01)
*H02J 3/46* (2006.01)
*H02J 7/14* (2006.01)

(52) U.S. Cl.
CPC ......... *H02J 13/00* (2013.01); *H02J 2007/143* (2013.01)

(58) Field of Classification Search
USPC .... 307/44, 43, 9.1, 10.1, 52, 80, 82, 57, 65, 307/84, 105, 102; 323/205, 207, 208; 333/23, 27, 25
See application file for complete search history.

(56) References Cited

U.S. PATENT DOCUMENTS

| | | | |
|---|---|---|---|
| 2003/0122360 A1* | 7/2003 | Badr | B60P 3/00 280/789 |
| 2008/0179959 A1 | 7/2008 | Folken et al. | |
| 2009/0108676 A1 | 4/2009 | Algrain | |
| 2010/0007207 A1* | 1/2010 | Peuser | H02J 1/10 307/10.1 |
| 2010/0214119 A1* | 8/2010 | Peuser | G05B 19/0423 340/9.1 |
| 2011/0285201 A1* | 11/2011 | Peuser | B60R 16/03 307/10.1 |
| 2015/0311903 A1* | 10/2015 | Frampton | H04B 3/542 700/287 |

* cited by examiner

SYSTEM OF PARALLEL-CONNECTED GENERATORS AND METHOD FOR LOAD SHARE BALANCING THEREIN USING A SERIAL COMMUNICATION NETWORK

PRIORITY CLAIM AND CROSS-REFERENCE TO RELATED APPLICATIONS

This application claims the benefit, under Title 35, U.S.C. § 119(e), of U.S. Provisional Patent Application Ser. No. 62/055,557 entitled METHOD FOR LOAD SHARE BALANCING IN A SYSTEM OF PARALLEL-CONNECTED GENERATORS USING A SERIAL COMMUNICATION NETWORK filed Sep. 25, 2014; and is related to U.S. patent application Ser. No. 14/626,372 entitled METHOD FOR LOAD SHARE BALANCING IN A SYSTEM OF PARALLEL-CONNECTED GENERATORS USING ACCUMULATED DAMAGE MODEL filed on Feb. 19, 2015, U.S. patent application Ser. No. 14/626,633 entitled METHOD FOR LOAD SHARE BALANCING IN A SYSTEM OF PARALLEL-CONNECTED GENERATORS USING SELECTIVE LOAD REDUCTION filed on Feb. 19, 2015, and U.S. patent application Ser. No. 14/626,811 entitled METHOD FOR OPTIMIZING THE EFFICIENCY OF A SYSTEM OF PARALLEL-CONNECTED GENERATORS filed on Feb. 19, 2015, the entire disclosures of which are incorporated herein by reference.

BACKGROUND

The present disclosure generally relates to systems and methods for generating and distributing electrical power, and more particularly such systems and methods which involve multiple electrical generator units connected in parallel.

Typically, a generator is a rotary electric machine of well-known type having a stator surrounded by a rotor that is driven through a belt or shaft by a prime mover (e.g., an engine) to electromagnetically induce electrical current in conductive windings of the stator, whereby mechanical power is converted into electrical power. The stator includes phase coils coupled in a Delta or Wye configuration. A generator may be a DC type that produces direct current or an AC type that produces an alternating current, the latter type also referred to as an alternator. Where used to charge a battery that powers an electrical system, alternator output is rectified. The stator is electrically coupled to the rectifier, which delivers the alternator output to the system bus. A DC generator may include an inverter to convert DC generator output to AC system output power as necessary. Reference herein to a "generator" may refer to either type (i.e., DC or AC) unless one particular type is specified. Often, each generator unit has its own dedicated digital microcontroller (referred to herein as a generator controller) which may be a plug and play device. Each of the generator controllers controls the operation of its respective individual generator unit, and cooperates in the operation of the overall parallel system, which is controlled by a system controller. The generators may coordinate among themselves or designate a system controller that is either internal to one generator or an external electronic control unit.

Parallel generator systems, wherein multiple generators of one type (i.e., DC or AC) are electrically connected to each other in parallel, may be adapted for use in stationary installations, usually to provide backup power for a building or campus, or in mobile installations, and may be a primary power source for charging batteries that provide electrical power for various types of vehicles, such as over-the-road tractors or large buses, for example. Parallel generator systems are well-known for ensuring an uninterrupted supply of power and have significant advantages over single large generator units in areas of cost effectiveness, flexibility, expandability, ease of maintenance and serviceability, and reliability.

The individual generator units operating in parallel systems are typically of smaller capacities, and may be identical or of variable output. In either case, these units can be connected in parallel with paralleling switchgear to achieve maximum output during peak requirement or the desired minimal output during other times.

Using multiple generator units in parallel offers greater flexibility than using a single large-sized generator of a high capacity. Multiple smaller generators operating in parallel do not need to be grouped together and can be distributed such that they are remotely located from each other and do not require a single, large space, as would be needed in the case of a single, larger generator. Furthermore, it is often difficult when sizing generators to match load requirements to accurately project increases in load and adequately plan for anticipated additional loads. By operating generators in parallel, however, variations in load can be relatively easy to accommodate by adding additional parallel-connected generators for additional power supply provided. Thus, by operating generators in a parallel system, it is easier to allow for an increase in the load requirement. Moreover, if a generator unit in the parallel system breaks down or requires maintenance, that individual unit can be removed from service, and repaired or replaced, without disrupting the functioning of the other generator units in the system.

The redundancy inherent in parallel operation of multiple generators provides greater reliability than is offered by single generator unit for critical loads. If one unit fails, the critical loads are redistributed among other units in the system. In many applications, critical loads needing the highest degree of reliable power account for only a fraction of the overall power generated by the system, and parallel systems provide the redundancy necessary to maintain power to critical loads even if one of its generator units fails. The redundancy inherent in a parallel system thus provides multiple layers of protection and ensures an uninterrupted supply of power for critical circuits.

In a parallel generator system, the entire load is shared by all of the parallel-connected generator units operating in the system, the active generator units, and in prior systems load sharing between the active generator units is typically done to ensure all active generator units contribute the same power toward the system load, or so that they all share the same voltage setpoint.

Some parallel generator systems employ a plurality of prime movers to drive the multiplicity of generators. For example, an engine may be dedicated to driving only a respective one of the multiplicity of parallel-connected generators, as is typical in large stationary backup power systems.

Other parallel generator systems, particularly those used in vehicles, employ a single engine to drive the multiplicity of generators. For example, the single engine of an over-the-road tractor or large bus drives each of the multiplicity of parallel-connected generators, which are typically alternators mounted to the engine and driven by the crankshaft through a common belt. Such vehicle-based systems of parallel-connected alternators typically provide rectified DC power to a battery (or multiple batteries) that provides power to the vehicle's electrical system. The multiple alternators may be identical to each other, and may be driven at a common speed that is a ratio of the engine crankshaft speed. The output of the stator windings of each alternator providing power to the system is normally controlled by a single voltage regulator common to all alternators in the system, or a single, dedicated voltage regulator for that respective alternator. The strength of each rotor's moving magnetic field, which induces current flow in the stator windings of the surrounding stator to generate alternator output voltage, is controlled by the voltage regulator(s).

The alternator regulator is configured to control the excitation current to a field coil carried by the rotor and that receives a signal from the regulator having a predetermined duty cycle. The regulator includes a field driver circuit configured to deliver an electric current signal to the field coil at a switching frequency. The field driver circuit is controlled by a dedicated generator controller and is configured to control the field current provided to the field coil. The field driver circuit may include a MOSFET transistor configured to control the electric current delivered to the field coil. The MOSFET transistor is switchable between an on-state and an off-state at the switching frequency. Transistor switching is controlled by the dedicated generator controller. The stator generates an output current having a magnitude that is based on the duty cycle of the signal applied to the field coil.

In general, when more current is provided to the field coil, the output voltage of the alternator increases. When less current is provided to the field coil, the output voltage of the alternator decreases. Vehicle alternators have traditionally utilized fixed frequency field drivers. In these alternators, a field driver circuit provides pulses of voltage to the field coil at a fixed frequency to control current, although some alternators utilize variable frequency field drivers that provide voltage pulses to their field coils at varying frequencies. In particular, the generator controller controls the field current output through the regulator by delivering control signals to the gate of the transistor. These control signals switch the transistor on and off such that the field voltage is provided as a pulse signal. The field voltage signal has a pulse duration $\tau$, and a pulse period T at which the pulses repeat. The duty cycle D is calculated as $\tau/T$. Depending on the inputs received, the dedicated generator controller may adjust the duty cycle D in an attempt to control alternator output by increasing or decreasing the pulse duration $\tau$. The commanded duty cycle of each alternator, which can range between zero and 100 percent, corresponds to the output voltage setpoint.

Generally higher rotor field duty cycles and rotor excitation currents result in higher output current from the generator and higher operating temperatures and other causes of generator unit operating stresses.

More efficient utilization of parallel-connected generators, and thus improved reliability and efficiency of a parallel generator system would be facilitated by systems and methods that better distribute the electrical load shared among the active generators in a manner that better equalizes their operating temperatures, the duty cycles of their rotor fields, and/or the excitation currents of their rotors, thereby equalizing the stress distribution amongst the generator units and maximizing system service life.

SUMMARY

The present disclosure provides a parallel generator system having a controller using load share balancing, and a method for using load share balancing in a parallel generator system. In accordance with the teachings of the present disclosure, more efficient utilization of the generator units of a parallel generator system is facilitated, thereby improving system reliability and efficiency vis-à-vis prior parallel generator systems, and maximizing the service life of the system.

The present disclosure provides parallel generator system having a service life and including a plurality of generator units, one of which is a master generator unit, and a system controller. A portion of the electrical load of one of the plurality of generator units is incrementally transferred to another generator unit by the system controller, on the basis of a comparison with the master generator unit indicating that the loads of the generator units, which are representative of their respective operating stress levels, are disallowably unbalanced, whereby load share balancing among the plurality of generator units occurs that tends to equalize the generator unit operating stress distribution amongst the plurality of generator units over the service life.

The present disclosure also provides a method for using load share balancing in a parallel generator system having a master generator unit and at least one slave generator unit, including: comparing indicia of load share of a subject generator unit being evaluated and of the master generator unit; determining, on the basis of the comparison, whether loads the subject and master generator units are disallowably unbalanced; and using a system controller to incrementally transfer a portion of the electrical load of one generator unit to another generator unit on the basis of the comparison, whereby load share balancing occurs amongst the plurality of generator units that tends to equalize the generator unit operating stress distribution amongst the plurality of generator units over the system service life.

Indicia of the generators' operating stress levels induced by their respective electrical load shares for comparison may include, for example, the sensed operating temperatures of a certain component of the compared generator units, their respective load levels, or the respective rotor duty cycles or excitation currents of compared alternators. Herein, the indicator used for comparison, regardless of particular kind, may be referred to as an operating stress indicator.

The present disclosure also provides a parallel generator system having a service life and including a system bus adapted for connection to an electrical load, a plurality of generator units including a master generator unit and at least one slave generator unit electrically connected in parallel to the system bus, and a controller in serial communication with each of the generator units. A portion of the electrical load of at least one generator unit is incrementally transferred to at least one other generator unit by the controller on the basis of an indication that the operating stresses of the generator units are disallowably unbalanced. Consequently, load share balancing tending towards equalization of operating stresses amongst the plurality of generator units occurs over the service life.

The present disclosure also provides a method A method for load share balancing in a parallel generator system, including: transferring electrical load between two or more of a plurality of generator units electrically connected to a system bus and including a master generator unit and at least one slave generator unit, during a portion of the system service life; using a controller for determining an indication that the operating stress levels of at least two generator units are disallowably unbalanced through evaluations of the respective operating stress levels of the generator units in comparison with the master generator unit operating stress level; and using at least one controller to incrementally transfer a portion of the electrical load of a generator unit to another generator unit on the basis of the comparative evaluation. Consequently, load share balancing tending to equalize the operating stress levels amongst the plurality of generator units occurs over the system service life.

Certain measurable aspects of each generator unit in a parallel system reflect its being operated under conditions understood to adversely affect its continued reliability. The probability of generator failure during operation increases with its time in operation, particularly under one or more stressing conditions understood to correlate with a shortening of its service life. Such conditions typically include, for example, operation under high temperature or operation under a heavy alternator load (high rotor field duty cycle or high rotor excitation current), either of which can contribute to high generator unit stress. In other words, for a given operating period, the failure of a generator unit operating at relatively higher generator unit stress is likely to occur before the failure of that unit under relatively lower stress. Generator unit stress can be affected, for example, by its or the system's design, capacity, component materials, location, installation placement, cooling provisions, and electrical loading, and other factors. If, over the accumulated time in operation, a generator unit's stress is significantly higher rather than lower, it is generally understood by those of ordinary skill in the art, that the likelihood of earlier failure will be greater. This may be due to greater wear and material degradation experienced with operation at higher stress influenced by one or more of the above-mentioned factors.

Reducing the electrical load or thermal share carried by an individual generator unit exhibiting a significantly higher operating stress, relative to the other generator units to which it is parallel-connected, can reduce the stress on that generator unit, and help prolong its service life without its burden being unduly shifted to the other generators that consequently carry incrementally greater portions of the total system load. The stress reduction on the partially load-relieved generator unit would be reflected by a reduction in, for example, its operating temperature, and thus its failure-inducing thermal stress.

In accordance with the present disclosure, the load on a generator unit whose operating stress is deemed excessive, vis-à-vis that of the master generator unit, is incrementally reduced, and shifted to the other generator units. The load on a generator unit whose operating stress is deemed low, vis-à-vis that of the master generator unit, is incrementally increased, and shifted from the other generator units. This results in the operating stresses of all generator units being substantially maintained, over time, at approximately the same level, maximizing the service life of the system.

In one embodiment according to the present disclosure, the plurality of parallel-connected generator units includes a master generator unit and at least one slave generator unit. An operating stress indicator of each generator unit, representative of its relative load share, is compared with the operating stress indicator representative of the relative load share of the master generator unit. If the comparison reveals substantial differences between these operating stress indicators, the output voltage setpoint of the subject generator unit is incrementally adjusted, whereby electrical loading of that generator unit is increased or reduced relative to the other generator unit(s). This voltage setpoint adjustment can either be constant, or linearly vary with the subject generator unit's electrical load, to result in the subject generator's output voltage setpoint being lower or higher than the output voltage setpoint of the master generator unit. Accordingly, the service lives of all generator units in the system tend towards equalization, resulting in maximal system life with minimal interim, unpredicted, and inconvenient generator unit failures that undermine system reliability and efficiency.

Thus, a system and method according to the present disclosure better allows the service lives of all generators of a parallel system to be made substantially equivalent, regardless of whether one generator unit bears a relatively greater or lesser portion of the total system load than the other generator units.

In parallel generator system embodiments according to the present disclosure, the generator controller of each generator serially communicates with the system controller. Compared to parallel communication networks, serial communication networks generally afford reduced system costs and complexity, and can better accommodate longer data transmission distances and smaller controller packaging spaces, further contributing to system cost effectiveness and reliability. Moreover, serial communication networks are often required by customers of parallel generator systems, and sometimes can be more easily and less expensively incorporated into a preexisting communication infrastructure.

BRIEF DESCRIPTION OF THE DRAWINGS

The above-mentioned aspects and other characteristics and advantages of a system and/or method according to the present disclosure will become more apparent and will be better understood by reference to the following description of exemplary embodiments taken in conjunction with the accompanying drawings, wherein.

DETAILED DESCRIPTION OF EXEMPLARY EMBODIMENT(S)

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
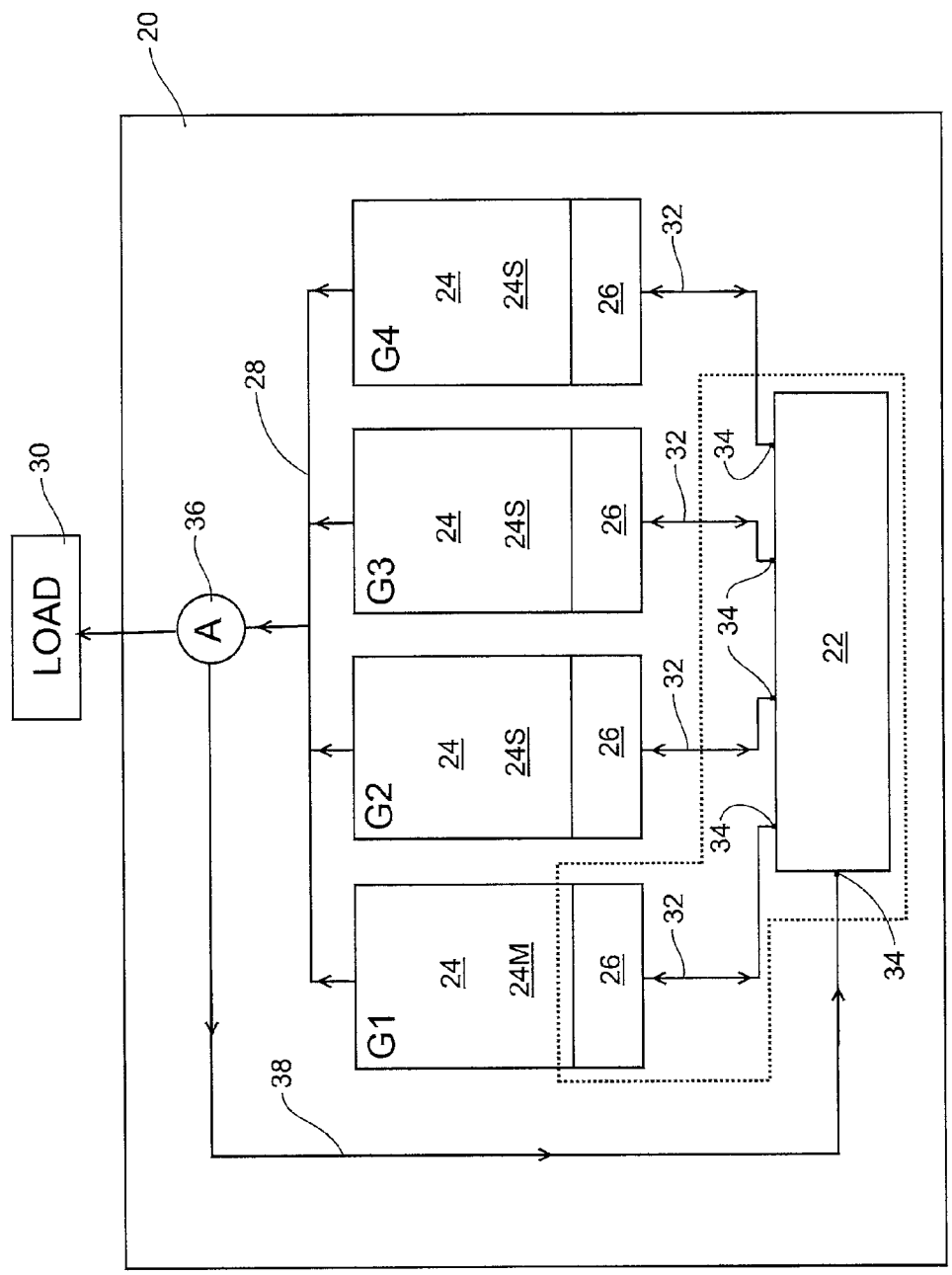
FIG. 1 depicts a schematic of an example parallel generator system embodiment according to the present disclosure.

FIG. 1 schematically shows an example parallel generator system embodiment connected to an electrical load. System 20 includes system controller 22, and four parallel-connected generator units 24, respectively designated G1, G2, G3, and G4, each with its own generator controller 26. The generator units 24 may be commonly driven by a single prime mover, or each may be driven independently of the others by a separate prime mover. The generator units 24 may also be of either DC or AC type. One of the generator units 24 (e.g., G1) is a master generator unit, designated 24M; the remaining generators units 24 (e.g., G2, G3, G4) are slave generator units, designated 24S. All generator units 24 are connected in parallel to a system bus 28. The master generator unit 24M serves to ensure that system 20 delivers the desired output voltage to the system load 30. Power generated by each generator unit 24 is transferred to the system load 30 through the system bus 28. In some embodiments, load 30 includes the battery (either a single battery or a group of interconnected batteries) of a vehicle charging system, and the generator units 24 are alternators, with the output voltage of the parallel-connected alternators 24 utilized to electrically charge the battery and power other electrical devices of the vehicle, collectively load 30.

Referring to FIG. 1, system controller 22 may be separate and located remotely from each of generator units 24. Alternatively, system controller 22 and the generator controller 26 of one of the generator units 24 (which may be master generator unit 24M), can be integrated into a single controller, as indicated by the dashed line surrounding controller 26 of generator unit G1 and system controller 22. System controller 22 may be a node in a CAN or LIN bus. Alternatively, each generator controller 26 may also be a node in the same or a separate CAN or LIN bus.

In one embodiment, the load share carried by, or the corresponding operating stress of, master generator unit 24M may be indicated in various ways, and is communicated to system controller 22 or to all slave controllers 26. Master generator unit operating stress indicator LM serves as a comparator against which each generator unit operating stress indicator Li, indicative of the corresponding operating stress of, or relative load share carried by, the respective generator unit 24, is evaluated in turn.

Indicator LM is indicative of the operating stress induced by the load share carried by the master generator unit 24M and may, for example, correspond to the duty cycle of a master alternator rotor field, the excitation current of a master alternator rotor, or the sensed operating temperature of a master generator unit component. Indicator Li is indicative of the operating stress induced by the load share carried by each respective subject generator unit 24, and is preferably of the same type as LM, such as being indicative of the duty cycle of a subject alternator rotor field, the excitation current of a subject alternator rotor, or the sensed operating temperature of a subject generator unit component. Herein, each respective generator unit 24 being evaluated according to the present disclosure is referred to as the subject generator unit. If the subject generator unit's indicator Li is deemed to differ significantly from the master generator unit's indicator LM, the output voltage setpoint of the respective subject generator unit 24 is adjusted to increase or decrease the load share carried by, or operating stress of, that generator unit 24, as described below.

As shown in FIG. 1 each of the generator controllers 26 is individually in serial communication with the system controller 22 through a respective serial communication cable 32. From the perspective of a generator controller 26, and as is typical of serial communication concepts, each serial communication cable 32 has, in addition to its ground line, a transmit line and a receive line over which data is communicated between the generator controller 26 and the system controller 22. Each generator controller 26 is connected through its respective cable 32 is its respectively associated serial port 34 of the system controller 22. Alternatively, in some embodiments the communication cables 32 could be daisy-chained.

An ammeter 36 may be provided between the system bus 28 and the system load 30, whereby the electric current provided by the system 20 to the load 30 is measured and provided as an input to the system controller 22 for determining the magnitude of the load 30. In other words, the load's total power demand on the system 20 may be determined by the system controller 22 using the current drawn by the load 30, as measured by and communicated from the ammeter 36. Such an ammeter 36 may be in serial communication with the system controller 22 via a serial communication cable 38. Alternatively, the portion of load 30 borne by each generator unit 24 can be measured by its generator controller 26, and these load portions summed up. For example, in some embodiments where the generator units are alternators, current can be determined from the duty cycle on all alternator voltage regulators. Thus, current, and therefore the load 30, can be determined through measurement internal to the generator unit(s) 24.

In one embodiment, all generator units 24 may initially have a common, known output voltage setpoint $V_{set}$. Alternatively, in another embodiment, the generator units 24 may initially have different initial output voltage setpoints. Regardless of whether the generator units 24 initially have a single, common output voltage setpoint or various different output voltage setpoints, the method described herein ensures a substantially equal distribution of operating stress amongst all generator units 24 of system 20 over time, thereby maximizing system life.

In the case of system 20 including a plurality of parallel-connected alternators 24 driven by a single prime mover, the respective generator controller 26 of master alternator 24M and each of the other, slave alternators 24S includes a voltage regulator by which the respective alternator output can be adjusted. Moreover, in some embodiments, master alternator 24M, may be of a remote sensing type, which utilizes a small gauge wire to read the actual voltage at the battery and signal the master alternator's regulator to increase the master alternator's output voltage setpoint to compensate for the voltage loss between the master alternator and the battery, ensuring a constant, desired voltage level at the battery. The additional output voltage forces current into the battery faster, thereby decreasing the charging time to reach full battery charge. In such embodiments, generator controller 26 of master alternator 24M thus receives a signal indicative of the actual voltage provided by system bus 28 to the battery. Alternatively, the actual voltage at the battery may be communicated to the generator controller 26 of master alternator 24M via a CAN bus. Adjustments to the output voltage setpoint of master alternator 24M, to compensate for the voltage loss, effect changes in the portion of the total load carried by master alternator 24M and thus in its indicator LM, the value of which is communicated to system controller 22 or the controller 26 of the subject alternator. Indicator LM serves as a basis against which indicator Li of each respective generator unit 24 is compared in a subsequent series of load balance evaluations and consequent adjustments to their respective output voltage setpoints, if prescribed.

In accordance with one embodiment of the present disclosure, all generator units 24 (i.e., master generator unit 24M and all slave generator units 24S) are evaluated in turn. Each generator unit 24 has its indicator Li compared with the most recently obtained indicator LM of master generator unit 24M, which is stored in the system controller 22 or 26. If a particular generator unit 24 has a higher or lower operating stress/load share, as indicated by Li, than permitted, indicating load imbalance, the electrical load on that generator unit 24 is respectively reduced or increased incrementally. Where an incremental electrical load reduction is called for, the portion of the electrical load removed from that generator unit 24 is transferred to the other generator units 24. Where an incremental electrical load increase is called for, the portion of the electrical load added to that generator unit 24 is transferred from the other generator units 24. Load reductions from and increases to the subject generator unit 24 can be achieved by respectively reducing or increasing the output voltage setpoint of that generator unit 24 in small incremental steps.

Some alternative embodiments of system 20 may redistribute the electrical loading between the subject generator unit 24 and the other generator units 24 by reducing or increasing the output voltage setpoint(s) of at least one of the other generator units 24, thereby reducing or increasing, respectively, the load share carried by the subject slave generator unit 24S for which adjustment is called for. Some other alternative embodiments of system 20 may perform a combination of reducing and increasing voltage setpoints of the subject generator unit 24 and at least one of the other generator units 24, respectively, to arrive at an electrical load redistribution that balances the operating stresses of all generator units in system 20.

Regardless of the approach, the redistribution of electrical loads amongst parallel-connected generator units 24 in system 20 according to the present disclosure is an iterative process that continues, within specified limits, until all generator units 24 operate at substantially equal operating stress levels, as indicated by their respective indicators Li, within a specified range relative to LM. This redistribution of electrical loads amongst generator units 24 tends to achieve an efficient balance between their operating stresses, rather than solely between portions of the total electrical load they carry, thus maximizing system life.

Figure 2:
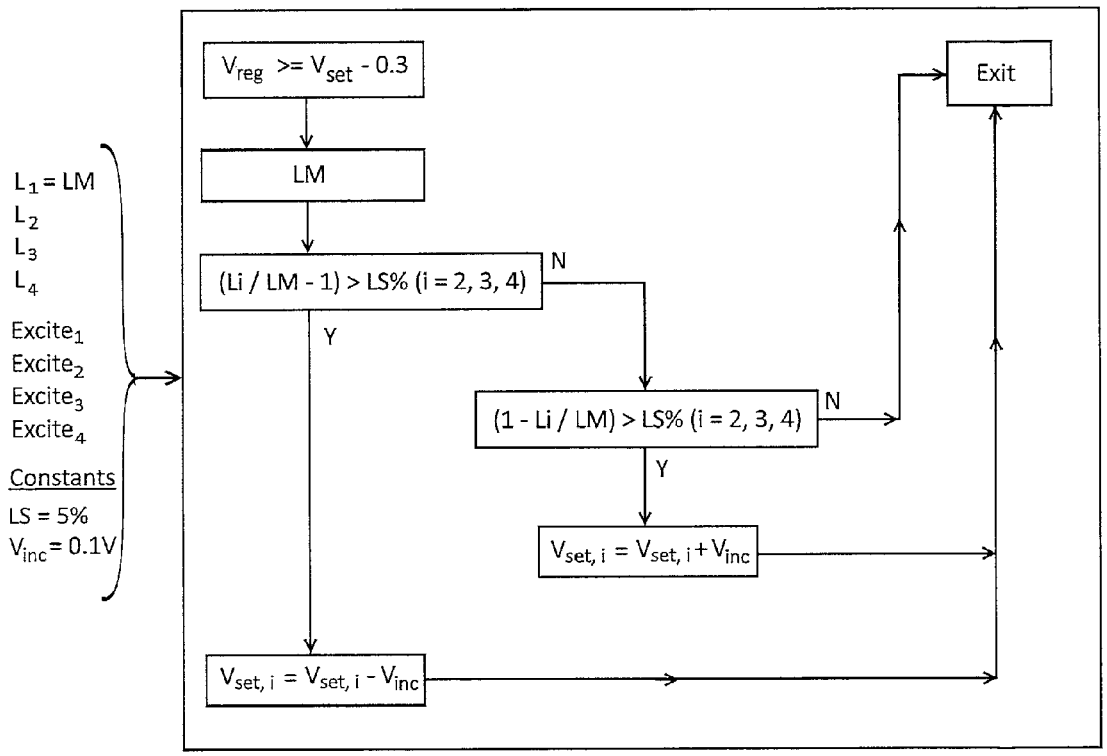
FIG. 2 shows an example of a load balancing algorithm for use in a method embodiment according to the present disclosure.

Referring to FIG. 2, in a method embodiment, the system controller 22 performs a load balancing algorithm having as an input the list of all operating, active generator units 24 of system 20, G1, G2, G3, G4 (indicated as $Excite_1$, $Excite_2$, $Excite_3$, and $Excite_4$), which are evaluated in turn on a rotating basis. Other inputs to the load balancing algorithm are the respective indicators Li of the subject generator units 24 as they are being evaluated, which are communicated to system controller 22 or 26 by their respective generator controllers 26, and the previous indicator LM most recently acquired or the average LM over a specified period. In the load balancing algorithm, indicator LM is obtained once per cycle and averaged, and utilized for LM in the evaluations of all subsequent generator units 24 in that cycle. In each cycle of evaluations, a new indicator LM value is thus obtained and averaged with each new evaluation of master generator unit 24M. Therefore, when evaluating master generator unit 24M each cycle, its indicator Li may be construed as the present LM or LMaverage.

The load balancing algorithm also utilizes as inputs an operating stress indicator threshold LS and a voltage increment $V_{inc}$ as constants. Other parameters used include the voltage that system 20 is regulated to provide, $V_{reg}$, the voltage setpoint $V_{set}$ of the system load 30, and the present voltage setpoint $V_{set,i}$ of the respective subject generator unit 24. In one embodiment, the operating stress indicator threshold LS is equal to five percent, and is specified as the limit within which the operating stress indicator Li of each subject generator unit 24 must be, relative to indicator LM of the master generator unit 24M. Voltage increment $V_{inc}$ is the amount by which the output voltage setpoint $V_{set,i}$ of the subject generator unit 24 may be incrementally increased or reduced as a consequence of the evaluation, and is set, for example, to 0.1 volts. It is to be understood that $V_{inc}$ may be a higher or lower magnitude than 0.1 volts. A filter is provided to provide sufficient time for the load balancing period, whereby the results of reducing the load on a particular generator may be realized before further adjustment. The load balancing period may, for example, be approximately ten to 15 minutes and only allow one alternator to shift load at a time in a delayed cadence to smooth out balancing.

Referring still to FIG. 2, the load balancing algorithm is applied to each generator unit 24 in turn: first applied to G2, followed by G3, followed by G4, followed by G1 communicating indicator LM at the start of the next evaluation cycle, etc. In each evaluation, the load balancing algorithm starts by determining whether the system load/battery 30 setpoint, $V_{set}$, is at least 0.3 volts higher than $V_{reg}$. This creates a method to allow all alternators, regardless of whether properly sharing, to contribute to the load and may or may not be included in the evaluation if for example more load is being drawn from the system than all alternators can provide. If the system load/battery 30 setpoint, $V_{set}$, is at least 0.3 volts higher than $V_{reg}$, the respective indicator Li of the generator unit 24 under evaluation is obtained and, respective to the generator unit 24 being evaluated, the obtained indicator Li is compared to the previously obtained LM averaged over time (e.g., one minute). For each evaluation done in a cycle, the comparison establishes an indicator ratio having a numerator that is the average indicator value Li, and a denominator that is the previously obtained average value of LM, which is applied in all generator unit evaluations within the cycle. Thus, the indicator ratio Li/LM is, in effect, Liaverage/LMaverage in the case of a slave generator unit 24S evaluation.

If the indicator ratio Li/LM minus one results in a difference that is greater than indicator threshold LS (e.g., 5%), then the setpoint $V_{set,i}$ of the subject generator unit 24 is reduced by $V_{inc}$ and the algorithm ends; otherwise, the algorithm continues to a next step which determines whether the difference of one minus the indicator ratio Li/LM is greater than indicator threshold LS (e.g., 5%). If so, then the setpoint $V_{set,i}$ of the evaluated generator unit 24 is increased by $V_{inc}$ and the algorithm ends; if not, then the algorithm ends. Once the algorithm ends, the evaluations continue in turn and the load balancing algorithm is applied to the subsequent generator unit in the cycle.

Accordingly, pursuant to each evaluation under the load balancing algorithm, if $L_i$ for any generator unit 24 differs from LM by more than allowed by the indicator threshold LS (here, by more than 5%), then the subject generator unit's voltage setpoint $V_{set,i}$ is either reduced or increased by the specified voltage increment, $V_{inc}$, which is 0.1 volt in the present embodiment.

Thus, where system controller 22 is provided inputs via a CAN or LIN bus, or where generator controllers 26 are daisy chained without a system controller 22, advantages exist for applying the above-described load balancing algorithm continually to each of master and slave generator units 24M, 24S in turn during each evaluation cycle or load balancing period, retaining and relying on the average obtained value of LM for each evaluation in a cycle. Over time, as the load balancing process is continually repeated, all generator units operate 24 tend towards equalization of operating stresses within the indicator threshold LS.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A parallel generator system having a service life and including:

a system bus adapted for connection to an electrical load;
a plurality of generator units including a master generator unit and at least one slave generator unit electrically connected in parallel to the system bus;
a controller in serial communication with each of the generator units;
wherein a portion of the electrical load of at least one generator unit is incrementally transferred to at least one other generator unit by the controller on the basis of an indication that the operating stresses of the generator units are disallowably unbalanced, whereby load share balancing tending towards equalization of operating stresses amongst the plurality of generator units occurs over the service life;
wherein indication of whether the operating stresses of the generator units are disallowably unbalanced is obtained using the controller by comparison of indicators representative of the respective operating stress level induced by the load shares of the respective generator units with an indicator representative of the operating stress level induced by the load share of the master generator unit; and
wherein the generator units are alternators, and the indicator is the rotor field duty cycle of an alternator.

2. The parallel generator system of claim 1, wherein the electrical load transference by the controller between two or more generator units is determined by the controller on the basis of a comparison of an operating stress indicator value of a subject generator unit under evaluation with a stress indicator value of the master generator unit.

3. The parallel generator system of claim 1, wherein each of the plurality of generator units is evaluated by the controller in turn as a subject generator in a continually repeating evaluation cycle, and wherein the master generator unit operating stress indicator value with which the operating stress indicator of the subject generator unit is compared is communicated to the controller by the master generator unit during a previous evaluation cycle.

4. The parallel generator system of claim 1, wherein the controller is a system controller and each generator unit has a respective generator controller controlling regulation of the output voltage setpoint of that generator unit,
wherein the operating stress indicator of each generator unit is monitored and serially communicated by the respective generator controller to the system controller, and
wherein incremental electrical load transference between a first generator unit and at least one other generator unit occurs on the basis of the operating stress indicator of the first generator unit and the operating stress indicator of the master generator unit differing by more than a permissible predetermined level, whereby the operating stress levels between at least two generator units tend towards equalization.

5. The parallel generator system of claim 4, wherein the permissible predetermined level is defined by a constant operating stress indicator threshold LS.

6. The parallel generator system of claim 4, wherein the incremental electrical load transference includes an operating stress level reduction on the first generator unit effected through incremental reduction of the voltage setpoint of the first generator unit until the operating stress indicator of the first generator unit relative to the stress indicator of the master generator unit is no higher than the permissible predetermined level.

7. The parallel generator system of claim 4, wherein the incremental electrical load transference includes an operating stress level increase on the first generator unit effected through incremental increase of the voltage setpoint of the first generator unit until the operating stress indicator of the first generator unit relative to the stress indicator of the master generator unit is no lower than the permissible predetermined level.

8. A parallel generator system having a service life and including:
a system bus adapted for connection to an electrical load;
a plurality of generator units including a master generator unit and at least one slave generator unit electrically connected in parallel to the system bus;
a controller in serial communication with each of the generator units;
wherein a portion of the electrical load of at least one generator unit is incrementally transferred to at least one other generator unit by the controller on the basis of an indication that the operating stresses of the generator units are disallowably unbalanced, whereby load share balancing tending towards equalization of operating stresses amongst the plurality of generator units occurs over the service life;
wherein indication of whether the operating stresses of the generator units are disallowably unbalanced is obtained using the controller by comparison of indicators representative of the respective operating stress level induced by the load shares of the respective generator units with an indicator representative of the operating stress level induced by the load share of the master generator unit; and
wherein the generator units are alternators, and the indicator is the rotor field excitation current of an alternator.

9. A method for load share balancing in a parallel generator system, including:
transferring electrical load between two or more of a plurality of generator units electrically connected to a system bus and including a master generator unit and at least one slave generator unit, during a portion of the system service life;
using at least one controller for determining an indication that the operating stress levels of at least two generator units are disallowably unbalanced through evaluations of the respective operating stress levels of the generator units in comparison with the master generator unit operating stress level; and
using the at least one controller to incrementally transfer a portion of the electrical load of a generator unit to another generator unit on the basis of the comparative evaluation, whereby load share balancing tending to equalize the operating stress levels amongst the plurality of generator units occurs over the system service life;
wherein the electrical load transference between two or more generator units is determined by the at least one controller on the basis of a comparison between an operating stress indicator for one of the generator units under evaluation communicated to the at least one controller, and an operating stress indicator for the master generator unit previously communicated to the at least one controller; and
wherein the generator units are alternators, and the operating stress indicator is the rotor field duty cycle or the rotor field excitation current of an alternator.

10. The method of claim 9, further comprising:
using the at least one controller to subject the plurality of generator units to a repeating evaluation cycle in which each generator unit is evaluated in turn.

11. The method of claim 9, further comprising:
using a controller defining a generator controller to monitor and serially communicate the operating stress indicator of the respective generator unit to a controller defining a system controller, and
incrementally transferring a portion of the electrical load of a first generator unit to at least one other generator unit using the system controller, on the basis of the operating stress indicator of the first generator unit differing from the operating stress indicator of the master generator by more than a permissible predetermined level, whereby the operating stress levels of at least two generator units tend towards equalization.

12. The method of claim 11, wherein the permissible predetermined level is defined by a constant operating stress indicator threshold LS.

13. The method of claim 11, comprising reducing the operating stress level on the first generator unit by incrementally reducing the voltage setpoint of the first generator unit until the operating stress indicator of the first generator unit relative to the stress indicator of the master generator unit is no higher than the permissible predetermined level.

14. The method of claim 11, comprising increasing the operating stress level on the first generator unit by incrementally increasing the voltage setpoint of the first generator unit until the operating stress indicator of the first generator unit relative to the stress indicator of the master generator unit is no lower than the permissible predetermined level.

* * * * *